United States Patent [19]

Nelson et al.

[11] Patent Number: 4,528,458

[45] Date of Patent: Jul. 9, 1985

[54] SELF-DIAGNOSTIC REDUNDANT MODULAR POWER SUPPLY

[75] Inventors: Hilding E. Nelson, Scandia; Myron A. Nesdahl, Coon Rapids; Marvin L. Gallati, Cambridge, all of Minn.

[73] Assignee: NCR Corporation, Dayton, Ohio

[21] Appl. No.: 568,968

[22] Filed: Jan. 6, 1984

[51] Int. Cl.³ .............................................. H02J 1/10
[52] U.S. Cl. ...................................... 307/64; 307/44; 307/66; 307/80; 340/516; 340/653; 340/825.16; 340/825.17; 324/51
[58] Field of Search ...................... 307/44, 64, 66, 80; 324/51; 340/516, 635, 653, 825.16, 825.17

[56] References Cited

U.S. PATENT DOCUMENTS

| | | | |
|---|---|---|---|
| 3,787,838 | 1/1974 | Feintuch et al. | 340/635 |
| 3,912,940 | 10/1975 | Vince | 307/64 |
| 4,204,249 | 5/1980 | Dye et al. | 307/64 X |
| 4,283,720 | 8/1981 | Herledan | 340/635 X |
| 4,316,097 | 2/1982 | Reynolds | 307/66 |
| 4,476,399 | 10/1984 | Yoshida et al. | 307/44 |

Primary Examiner—A. D. Pellinen
Assistant Examiner—Derek S. Jennings
Attorney, Agent, or Firm—J. T. Cavender; Edward Dugas; Floyd A. Gonzalez

[57] ABSTRACT

A redundant modular power supply having a plurality of modules including a redundant module is disclosed which includes an apparatus for testing for a fault in any of the modules of the power supply. The redundant module is provided with a margin terminal, which when receiving a command from the testing apparatus, causes the redundant module to output current. The testing apparatus periodically issues such commands to the redundant module, monitors the output of the redundant module, and indicates an error condition if the redundant module does not respond properly to the commands from the testing apparatus. If the redundant module outputs current when not commanded to do so, a failure of one of the other modules in the power supply is indicated. If the redundant module fails to output current when commanded to do so, a failure of the redundant module is indicated.

18 Claims, 22 Drawing Figures

SELF-DIAGNOSTIC REDUNDANT MODULAR POWER SUPPLY

BACKGROUND OF THE INVENTION

The present invention relates to a regulated redundant modular power supply, and more particularly to a redundant modular power supply having an apparatus for testing the output of the modules, including the redundant module. The power supply also includes indicators for indicating a fault in any one of the power supply modules, including the redundant module.

Power supplies are known having redundancy such that if a failure occurs in the power supply, automatic switching occurs to a redundant portion of the power supply for ensuring continuous regulated output of the power supply. One such power supply is disclosed in U.S. Pat. No. 4,177,389, issued Dec. 4, 1979, to Heinrich Schott. The Schott apparatus includes a power supply system having two regulated power supply devices with outputs connected in parallel for redundant half-load operation. Transfer switch and discriminator means are provided to transfer the load from one power supply device to the other in the event of a failure of one of the power supply devices operating in a voltage regulation mode.

U.S. Pat. No. 3,912,940, issued Oct. 14, 1975, to John Vince, discloses a redundant power supply apparatus having output indicators connected to the output terminals of each power supply portion to indicate the functional condition of each portion of the redundant power supply.

U.S. Pat. No. 3,748,500, issued July 24, 1973, to Ford Tam, discloses a multiple redundant power supply for supplying a constant voltage at output terminals from separate voltage sources. If one of the voltage sources fails, means are provided to automatically transfer the load to a second voltage source. A manual switch means is provided for manually switching to the alternate voltage source to test its operability.

SUMMARY OF THE INVENTION

The power supply of the present invention includes a multiple number of power supply modules, of which one is a redundant module not needed to supply power to the load unless another module in the power supply fails. The redundant module includes means which, when activated, causes the redundant module to output current regardless of the status of the other modules in the power supply. The redundant module also includes indicating means for providing an indication of the output status of the redundant module. Also provided, is a testing means which periodically instructs the redundant module to output current. The indicating means of the redundant module is monitored to ascertain if the redundant module or the other modules of the power supply have failed. Failure of the redundant module to output current in response to instructions to do so by the testing means, or output of current by the redundant module when not instructed to do so by the testing means, raises an error condition which may be displayed to indicate a fault within the power supply.

In a preferred embodiment, the power supply includes a plurality of worker modules operatively connected in parallel for supplying electrical current and a redundant module operatively connected in parallel with the worker modules. The redundant module is operable for supplying electrical current upon the failure of one of the worker modules. Also included in the power supply in a test circuit operatively connected to the redundant module which alternately tests the worker modules, and then the redundant module, for correct operation of the power supply.

It is therefore an object of the present invention to provide a redundant modular power supply which indicates when either the redundant module or one of the other modules in the power supply has failed.

It is also a function of the present invention to provide a redundant power supply which periodically tests the ability of the redundant power supply to supply power in the event of a failure by one of the other power supply modules.

A further function of the invention is to provide a modular power supply which gives a visual indication of the operating condition of each power supply module.

It is a further object of the invention to supply a redundant modular power supply in which a failed module of the power supply may be replaced without interrupting regulated power to a load.

It is a further object of the invention to provide a redundant modular power supply which may be operated to provide a continuous regulated voltage in the event of a failure of one of the modules of the power supply.

DESCRIPTION OF THE PREFERRED EMBODIMENT

Figure 1:
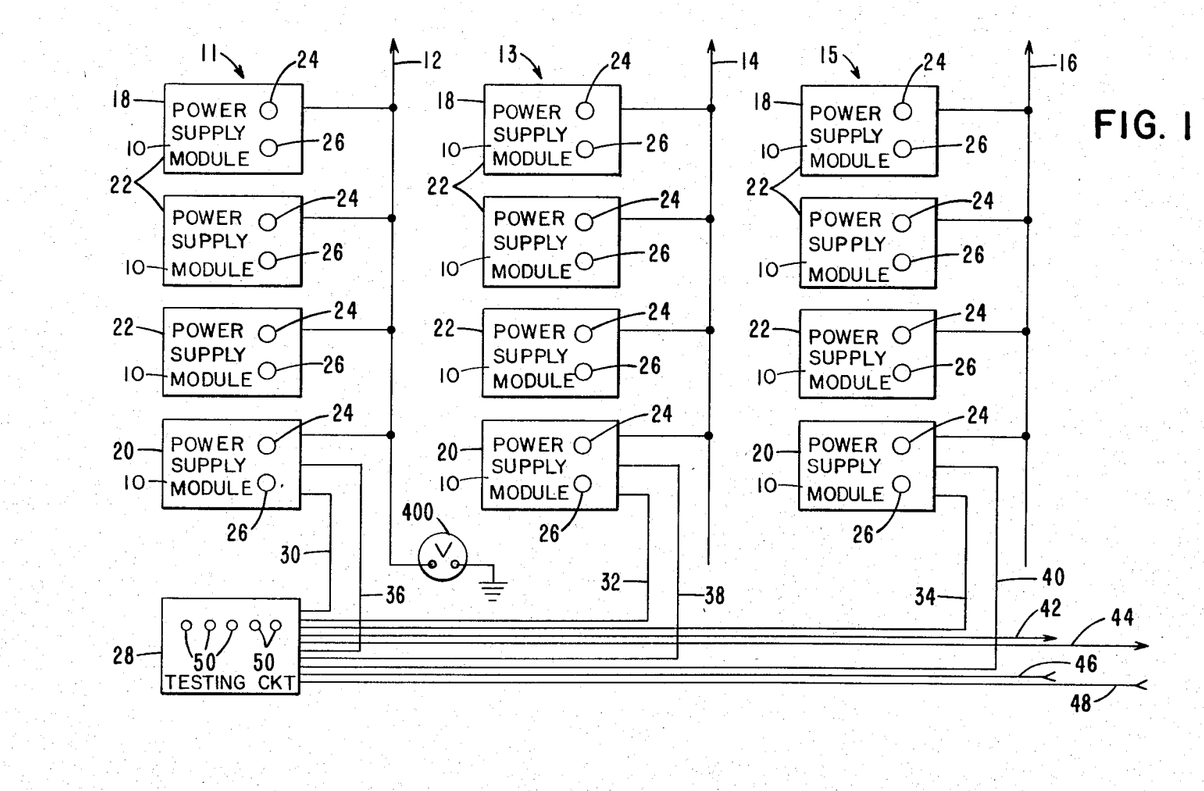
FIG. 1 is a block diagram of a power supply utilizing the invention wherein the power supply provides regulated voltages to a plurality of voltage decks.

FIG. 1 is a block diagram of a power supply including the present invention. The power supply includes a plurality of power supply modules 10 which are grouped together in decks 11, 13 and 15, with each deck connected to a voltage bus for supplying voltage at regulated voltage levels such as +5 volts at 12, +12 volts at 14, and −12 volts at 16. Other voltage levels which are typically used in electronic and computer equipment applications may be supplied by similar voltage decks. The power supply modules 10 of the present invention are adjusted such that the current demand of each voltage deck is met by the combined output of worker power supply modules 22 of that deck, and one module of the deck is adjusted to be a redundant power supply module 20. One of the worker power supply modules 22 is adjusted to be a controlling power supply module 18.

Each power supply module 10 has two indicators for indicating the status of that power supply module. In the modules of the present invention, a voltage regulation indicator in the form of a green light emitting diode (LED) 24, and a current-output indicator in the form of an amber LED 26 is provided on each power supply module 10. As will be explained later, the power supply modules are adjusted such that under full load the controlling module 18 is adjusted until both the green and the amber LED's 24 and 26 are illuminated indicating that the bus of the respective voltage deck is at the regulated voltage and being regulated by the controller module 18. The other worker modules 22 are adjusted until voltage indicator 24 is extinguished and the current-output indicators 26 for each module are illuminated indicating that the other worker modules 22 are supplying output current to the bus 12. The redundant module 20 is adjusted such that during the normal work period of the power supply the green LED 24 is illuminated and the amber LED 26 is extinguished indicating that the redundant module 20 is at or above its regulated voltage point but is not outputting current.

A module testing circuit 28 is provided for testing each of the redundant modules 20 in the voltage decks to determine if the worker modules 22 in each deck are working properly, and if the redundant modules 20 are able to work if called upon. As will be explained, the testing module 28 interrogates, in turn, the redundant module 20 of each voltage deck. The interrogation is done by an electrical signal over line 30 to voltage deck 11, line 32 to voltage deck 13, and line 34 to voltage deck 15. The electrical signal to the redundant module 20 of the respective deck causes the redundant module to momentarily output current as if it had been called upon to work. An appropriate current-out signal is sent by the redundant module 20 of voltage deck 11 to the testing module 28 over a conductor 36, indicating that the redundant module 20 of deck 11 is operative to output current when requested to do so. Similar output current indicator response lines 38 and 40 are provided between the voltage decks 13 and 15 respectively to the testing module 28. Additional voltage decks (not shown) may be tested by testing module 28 by use of request lines 42 and 44 and response lines 46 and 48 in a similar manner.

The testing module includes a series of red LED's 50 for indicating if a fault has occurred in any of the power supply modules in any of the decks, with one red LED being assigned to each voltage deck being monitored by the test module 28. As will be discussed, the test module 28 interrogates each redundant module in each deck to determine if the redundant module is outputting current during the normal work cycle of the power supply and without having been requested to do so by the test module 28. If the redundant module being tested is outputting current without having been requested to do so, it indicates that one of the worker modules in that voltage deck has failed. In an established test cycle after the worker test, the testing module 28 then orders, in turn, each redundant module to output current and monitors the module to determine if the module has delivered current when instructed to do so. If the redundant module does not deliver current when instructed to do so, a failure in the redundant module has occurred and the respective red LED 50 for that deck is illuminated to indicate the failure. Thus, the test module 28 alternately tests the worker modules of each deck for failure and then tests the redundant module of each deck for failure. If any failures are found, the indicator for that deck is illuminated, indicating in which deck a failure has occurred. A visual check of the power supply modules in the indicated deck will then ascertain which module has failed so that the failed module may be replaced.

For instance, if one of the worker modules 22 in deck 11 has failed, the amber LED 26 for that worker module will be extinguished, and the amber LED of the redundant module 20 will be illuminated. If the failed module is the redundant module 20, all of the amber LEDs 26 of the worker modules 22 will be illuminated.

Figure 2A:
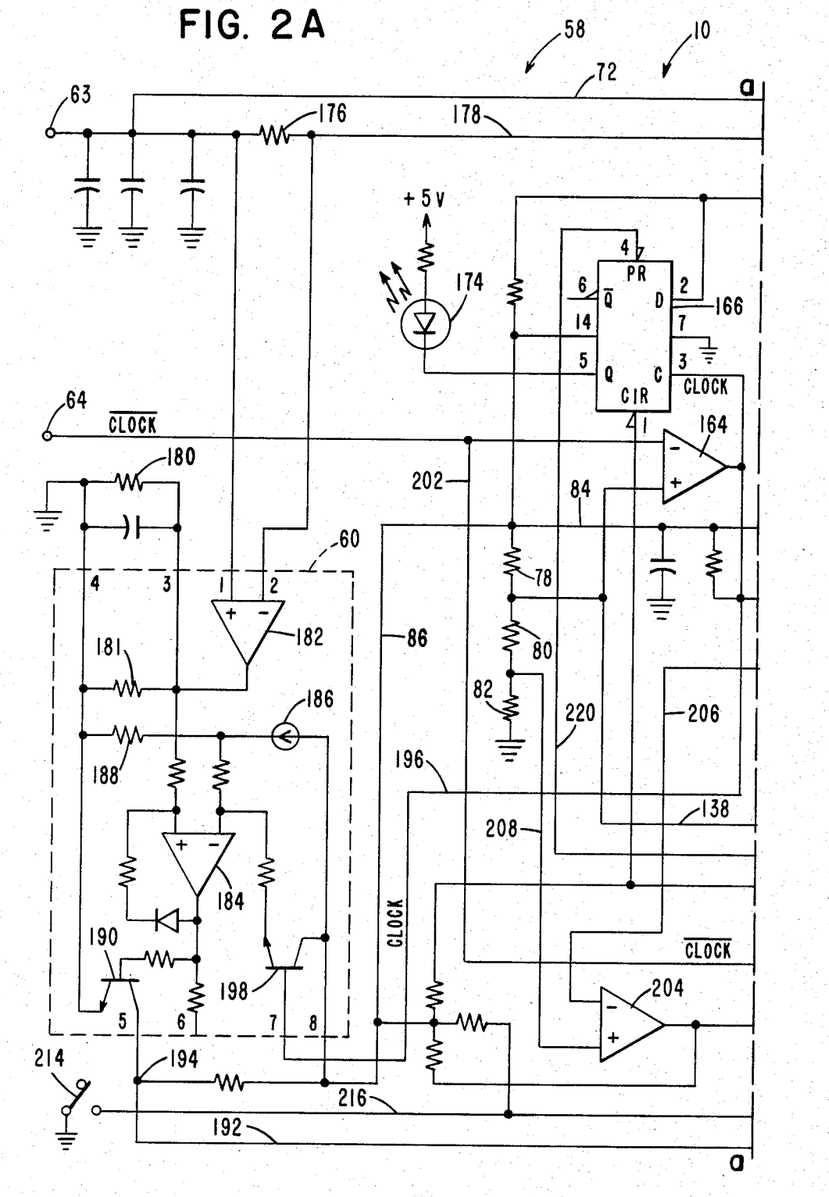
FIGS. 2A through 2C joined along lines a—a and b—b form a schematic diagram of a power supply module for use in the power supply of FIG. 1.
Figure 2B:
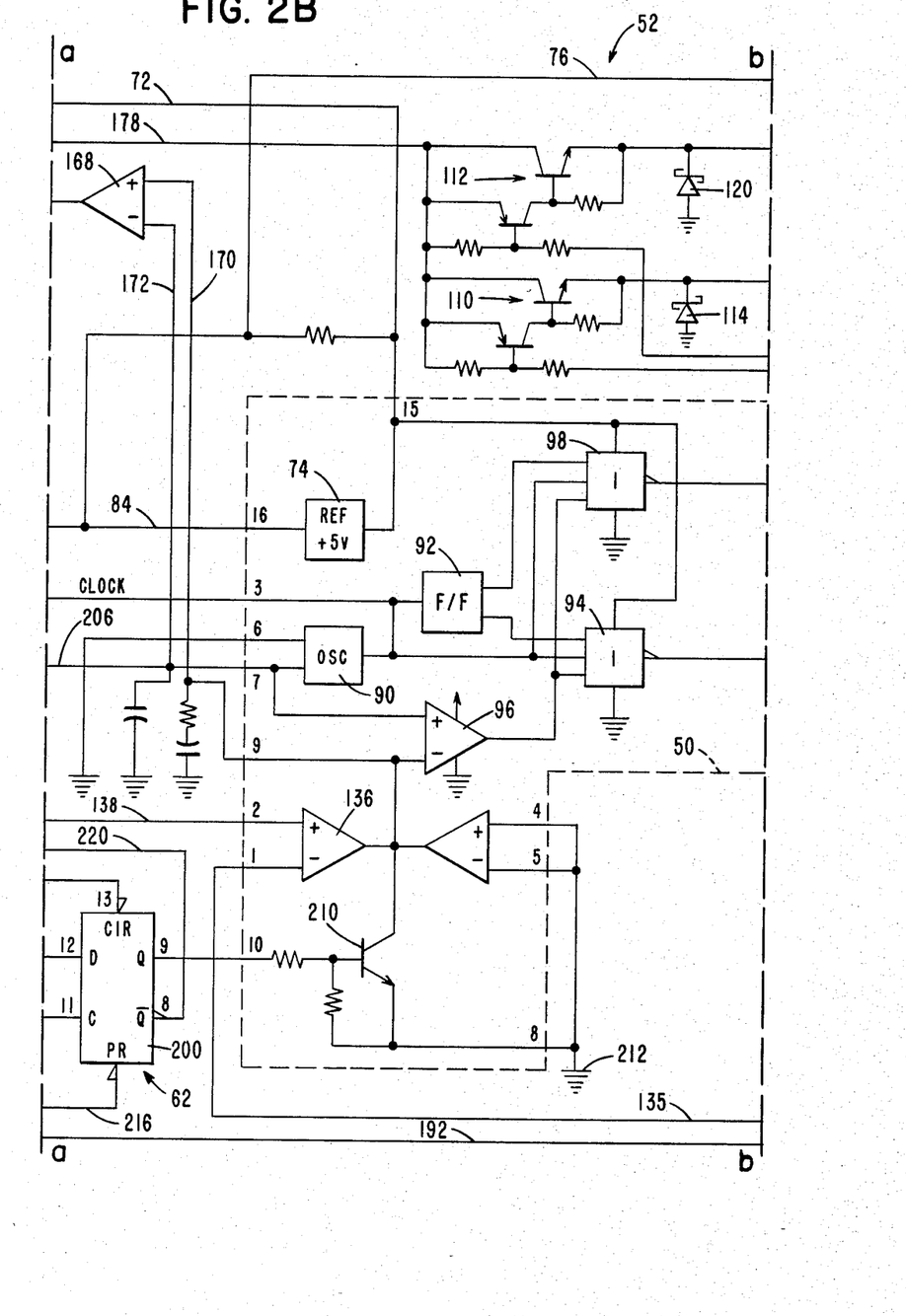
Figure 2C:
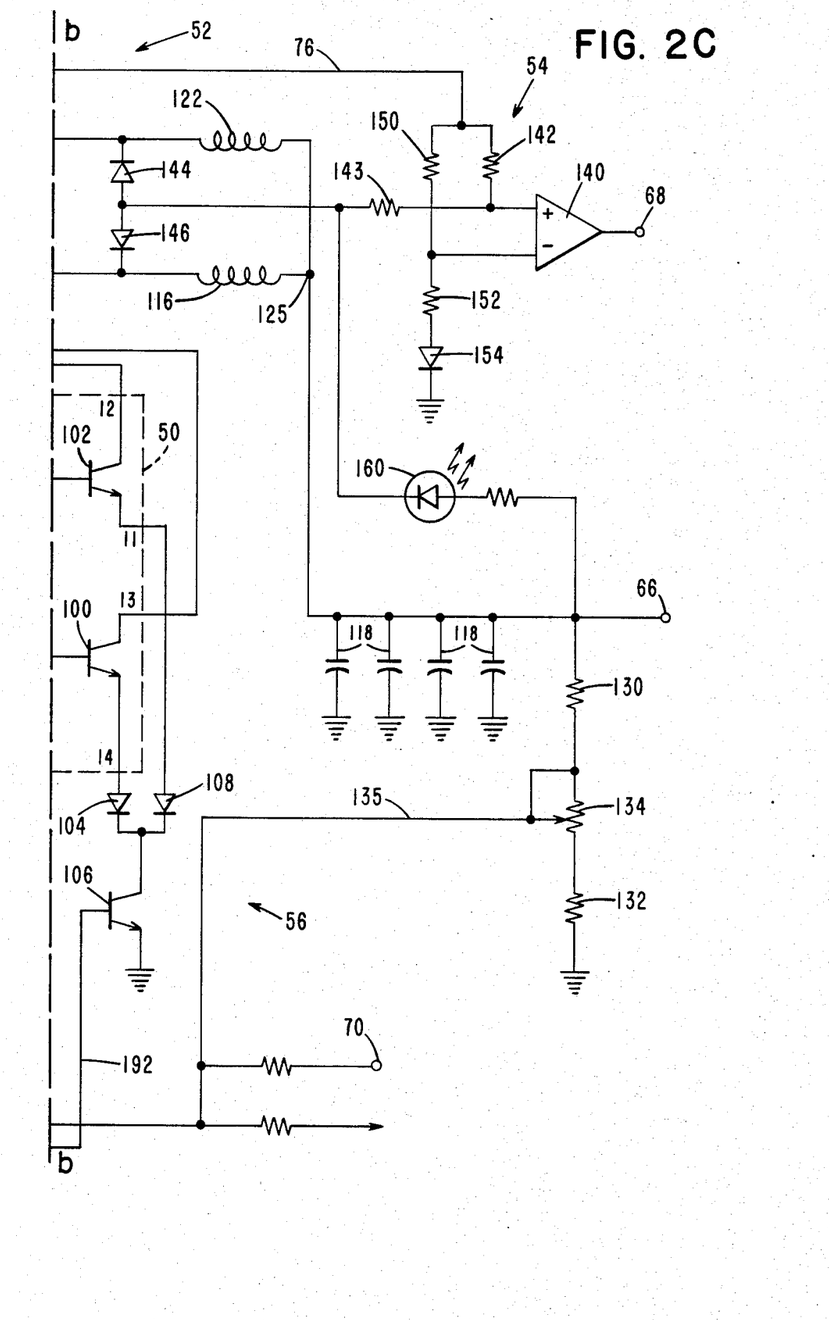

Turning now to FIGS. 2A, 2B and 2C, each power supply module includes a power supply control circuit 50, a power-output circuit 52, a current out indicating circuit 54, a feedback circuit 56, a voltage regulation indicating circuit 58, a current limit circuit 60, and a lost clock detector circuit 62. The power supply module has a raw power input terminal 63 for supplying raw power, typically at 30 volts, to the circuit. A negative clock ($\overline{CLOCK}$) input 64 is provided which is common to all of the power supply modules for controlling all of the modules from an external power clock (not shown). Each module has a power supply output terminal 66 for connection to the proper voltage bus.

Each power supply module has a current-out indicating terminal 68 and a margin terminal 70 which, when receiving the proper electrical signal, causes the module to output current, as will be explained.

The remainder of the discussion in connection with FIGS. 2A, 2B and 2C shall apply to power supply modules having a +5 volt output. However, changes which are well understood in the art can be made to adjust the output voltage of the power supply modules to be any of the voltages commonly used in electronic or computer equipment, as desired.

Regulated output of a power supply module is controlled by a power supply control chip 50 which, in the exemplary embodiment, is an SG3524 available from Silicon General, Inc. of Garden Grove, Calif. The control chip 50 controls the duty cycle of a pair of switches in the power-output circuit 52 to effect regulated output of the power supply module.

Figure 4A:
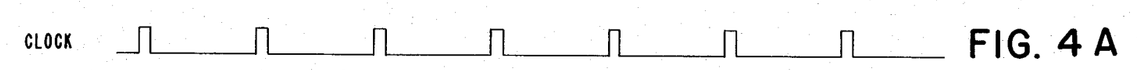
FIG. 4A through FIG. 4P are waveforms present in the power supply module of FIGS. 2A through 2C.
Figure 4B:
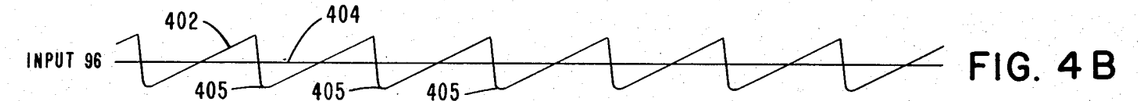

Raw voltage is supplied over conductor 72 from the raw power input terminal 63 to pin 15 of the control chip 50. Internal to the control chip 50 is a regulated power supply 74 which outputs a regulated +5 volts at pin 16 of the control chip 50. As can be seen in FIG. 2, regulated +5 volts is supplied to the current indicating circuit 54 over conductor 76, to a voltage divider circuit formed of resistors 78, 80 and 82 over conductor 84, and to the voltage input pin 8 of the current limit circuit 60 over conductor 86. References to the waveforms of FIGS. 4A–4P are shown in parenthesis. An oscillator 90 internal to the control chip 50 controlled by positive clock (CLOCK) pulses (FIG. 4A) input at pin 3 of control chip 50, provides a ramp voltage (FIG. 4B at 402) to pin 7 of the control chip 50. The clock pulses at pin 3 of the power control chip 50 are applied to the input of the flip-flop 92 as shown. Clock pulses on pin 3 are also input to one input of each a pair of NOR gates 94 and 98. One output of the flip-flop 92 is connected to one input of NOR gate 94, and the other output of flip-flop 92 is connected to one input of NOR gate 98. The output of comparator 96 (FIG. 4C) is also input into the NOR gates 94 and 98 as shown. The output of NOR gate 94 is connected to transistor switch 100, and the output of NOR gate 98 is connected to transistor switch 102. The emitter of transistor switch 100 is grounded through a diode 104 and the transistor switch 106 as shown. Likewise, the emitter of the transistor switch 102 is grounded through diode 108 and the transistor switch 106.

Figure 4C:
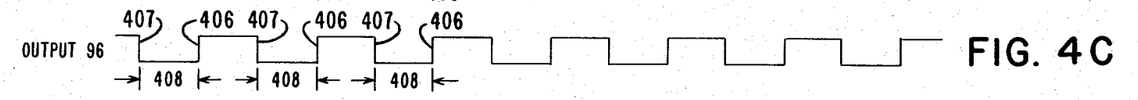
Figure 4D:
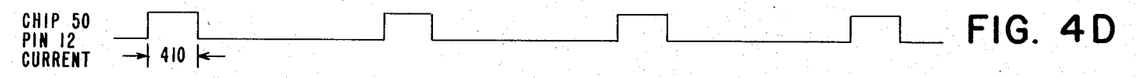
Figure 4E:
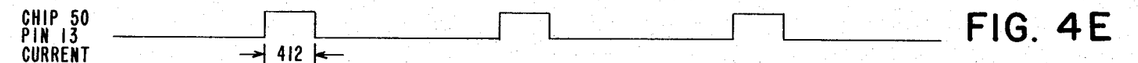
Figure 4F:
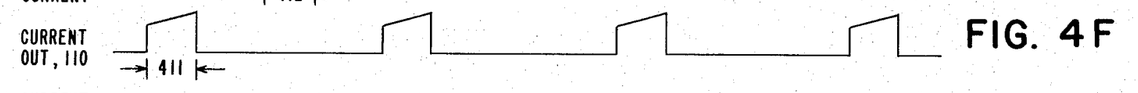
Figure 4G:
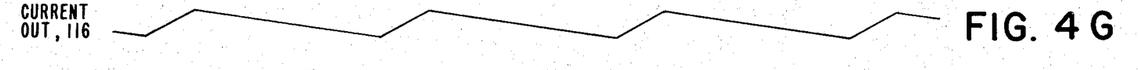
Figure 4H:
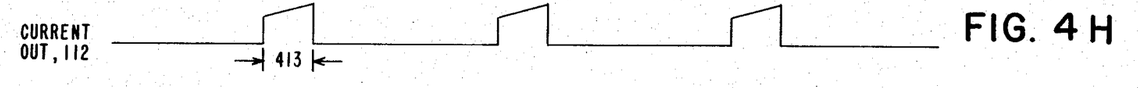
Figure 4I:
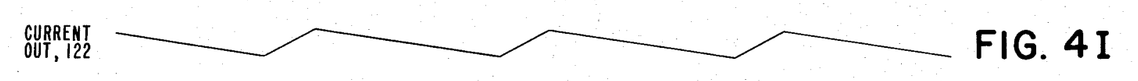
Figure 4J:
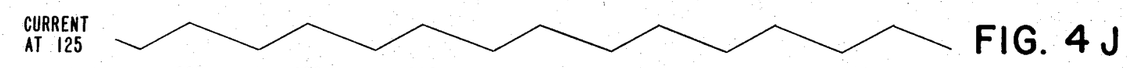

The collector of the transistor switch 102 is connected to pin 12 (whose output current is shown in FIG. 4D) of the power control circuit 50, and drives one of the power switches in the form of a Darlington circuit 110 (whose output current is shown in FIG. 4F) in the power-output circuit 52. Likewise, the collector of transistor switch 100 is connected to the pin 13 (whose output current is shown in FIG. 4E) of the power control switch 50, and drives the power switch in the form of the other Darlington circuit 112 (whose output current is shown in FIG. 4H) in the power-output circuit 52. The cathode of a freewheeling diode 114, the inductor 116, and the capacitors 118 are provided in the output circuit of power switch 110, and a freewheeling diode 120, inductor 122 and capacitors 118 are connected in the output circuit of the power switch 112 to rectify and smooth out the combined current-output of the power output circuit 52 (the output current of inductor 116 is shown in FIG. 4G, the output current of inductor 122 is shown in FIG. 4I, and the current at junction 125 into the output filter capacitors 118 is shown in FIG. 4J).

Resistors 130 and 132 and potentiometer 134 form a voltage divider, with the wiper terminal of the potentiometer 134 connected to a conductor 135 in the feedback circuit 56 which is connected to the negative input of error amplifier 136 in the control chip 50. The positive input of the error amplifier 136 is connected to the voltage divider circuit between resistor 78 and resistor 80 by conductor 138. The voltage divider circuit formed by resistors 78, 80 and 82, is arranged such that approximately one-half of the voltage output from the regulated voltage supply 74 is applied to the positive terminal of error amplifier 136. Also, about one-half of the voltage at the output terminal 66 is applied to the negative input of error amplifier 136, as determined by the resistors 130 and 132, and the setting of potentiometer 134.

It will thus be understood that as the voltage between the wiper of potentiometer 134 and ground decreases below the voltage across resistors 80 and 82, the output voltage of error amplifier 136 will increase. Conversely, as the wiper voltage level rises, the output of error amplifier 136 will decrease. The amplified error signal from amplifier 136 (FIG. 4B at 404) is applied to the negative input of comparator 96 and appears at pin 9 of the control chip 50.

The ramp voltage produced by oscillator 90 is applied by an internal connection to the positive input of comparator 96. It will thus be understood that when the ramp voltage of oscillator 90 drops to its lowest point (FIG. 4B at 405), it will typically be below the voltage being output from error amplifier 136, and the output of comparator 96 will then go low, (FIG. 4C at 407) which low will be applied to the inputs of NOR gates 94 and 98. When the ramp increases to above the voltage output from error amplifier 136, the output of comparator 96 will go high (FIG. 4C at 406), which will be understood to change or keep the outputs of NOR gates 94 and 98 low. Thus, changing the setting of potentiometer 134 will change the value of the error amplifier 136 and thus adjusts the width of the pulses (FIG. 4C at 408) coming from comparator 96. This width adjustment controls the NOR gates 94 and 98 to change the duty cycles of the power switches 110 and 112 (FIGS. 4D and 4F at 410 and 411, respectively, and FIGS. 4E and 4H at 412 and 413, respectively), thereby controlling the current flow through conductor 178, and is reflected in the voltage at terminal 66 of the power supply module.

Current output indicator circuit 54 includes a comparator 140 which is one-fourth of a quad comparator chip LM339 which is available from Silicon General, Inc. The positive input of comparator 140 is connected through resistor 142 to the regulated +5 voltage supply on conductor 76, and through resistor 143 to the midpoint voltage of the power switches 110 and 112 by the connection with diodes 144 and 146 as shown. The negative input of comparator 140 is connected through resistor 150 to the regulated +5 voltage by conductor 76, and is grounded through resistor 152 and diode 154 as shown. An amber LED 160, which is one of the amber LED's 26 of FIG. 1, is connected with its anode connected to the output terminal 66, and its cathode connected to the midpoint voltage of power switches 110 and 112 as shown.

When no current is flowing through inductors 116 and 122, the voltage on the positive input of comparator 140 rises until it is above the voltage on the negative input, and a high appears at the current-out terminal 68 of the current indicating circuit 54. Also, the amber LED 160 is reversed biased such that it turns off.

However, when the inductors 116 and 122 are conducting current, the voltage on the positive input of comparator 140 falls below the voltage on its negative input, and a low appears at terminal 68. Also, the voltage at the midpoint between the anodes of diodes 144 and 146 will be below the voltage on terminal 66, and the LED 160 will turn on, giving a visual indication that the power supply module is outputting current.

Comparator 164 is one-fourth of the quad comparator chip LM339. The negative clock input terminal 64 is connected to the negative input of comparator 164, and the positive input of comparator 164 is connected between resistors 78 and 80 such that one-half of the reference +5 volts is applied to its positive input. Thus, when the voltage on negative clock input terminal 64 drops below the voltage on the positive input of comparator 164, the output of comparator 164 goes positive to apply a positive clock pulse to pin 3 of flip-flop 166. A positive clock pulse is also input to the clock input, pin 3, of the power control chip 50 to toggle the flip-flop 92 and reset the oscillator 90 therein.

Figure 4K:
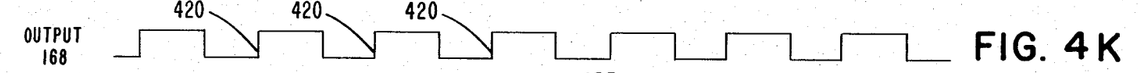

The flip-flop 166 is one-half of a 74LS74 available from the Fairchild Division of Schlumberger Corporation, Mountain View, Calif. Comparator 168 of the voltage indicating circuit 58 is one-fourth of the quad comparator LM339 mentioned previously. The positive input of comparator 168 receives the amplified error signal from the error amplifier 136, which is available at pin 9 of the power control chip 50, over the conductor 170. The negative input of the comparator 168 is connected to pin 7 of chip 50 by conductor 172 for inputting the ramp signal output of the oscillator 90. Thus, the output of comparator 168 (FIG. 4K) will be the inverse of the output from comparator 96 (FIG. 4C) in the control chip 50.

A green LED 174, which is one of the green LED's 24 in FIG. 1, has its cathode connected to the Q output, pin 5, of the flip-flop 166, and its anode connected to a +5 v. source. Pin 14 of the flip-flop 166 is connected to the +5 v. reference voltage source 74, and pin 7 is grounded. The output of comparator 168 is connected to the D input, pin 2, of the flip-flop 166, and clock pulses from the output of comparator 164 is connected to the clock or C input, pin 3, of flip-flop 166. It will be understood that the rising edge of a clock pulse on pin 3 of flip-flop 166, will cause the Q output on pin 5 to go to the state of the D input on pin 2 of the flip-flop 166. Thus, if the output of comparator 168 is high during the rising edge of a clock pulse, the Q output on pin 5 of flip-flop 165 will go or stay high, thereby turning off LED 174. If the output of comparator 168 is low during the rising edge of a clock pulse, the Q output on pin 5 of flip-flop 166 will go or stay low, thereby turning on LED 174.

Looking at FIGS. 2A and 2B, it will be seen that a clock pulse will be simultaneously applied to the oscillator 90 and the clock input on pin 3 of the flip-flop 166. There will be a slight delay between the arrival of the rising edge of a clock pulse and the decline of the voltage output of oscillator 90. Thus, when the potentiometer 134 of FIG. 4C is adjusted such that the power supply module is in its voltage regulation mode, the output of comparator 168 will still be low during the rising edge of a clock pulse (FIG. 4K at 420) and the LED 174 will be turned on.

If the potentiometer 134 is adjusted such that the error voltage on the positive input of comparator 168 is higher than the peak voltage output of the oscillator 90, the voltage on the D input at pin 2 of the flip-flop 166 will be high during the rising edge of a clock pulse on the clock input on pin 3 of the flip-flop 166. In that case, the Q output on pin 5 of flip-flop 166 will go high or remain high, thereby turning off LED 174.

Returning to transistor switch 106, it will be understood that the power switches 110 and 112 will be alternately driven by the control chip 50 as long as the transistor switch 106 is turned on and conducting. Transistor 106 is controlled by the output pin 5 of the current limit chip 60. Current limit chip 60 is a current sense latch SG3549 available from Silicon General, Inc.

The voltage drop across resistor 176 in the power supply conductor 178 is sensed by the current limiting chip 60. When the current through resistor 176 exceeds a pre-set threshold, the current limit chip 60 turns off transistor switch 106, thereby turning off power switches 110 and 112. The threshold is determined by adjusting the size of the resistor 176 and a resistor 180 which is in parallel with an internal resistor 181 of the chip 60. The output of a unity gain amplifier 182 internal to the chip 60 is applied to the parallel resistor circuit composed of resistors 180 and 181 to set the threshold voltage which is applied to the positive input of a comparator 184 internal to the chip 60. The output of an internal constant current source 186 is dropped across an internal resistor 188 in the chip 60 to form a comparison voltage applied to the negative input of the comparator 184. The resistors 176 and 180 are sized such that during the normal operating range of the power supply module, the voltage applied to the positive input of the comparator 184 is lower than the comparison voltage at the negative input of comparator 184, making the output of comparator 184 normally low. This normally low output holds the transistor 190 in the off or non-conducting state such that transistor 106, whose base is connected both to the collector of transistor 190 by conductor 192 and the regulated voltage by conductor 86 at junction 194, is in the normally on or conducting state.

When the threshold drop across resistor 176 is reached, the voltage on the positive input of the comparator 184 exceeds the voltage set by the constant current supply 186, and the output of comparator 184 goes high, turning on transistor 190. When transistor 190 is turned on, the base of transistor 106 is pulled down to ground and turns off, thereby turning off power switches 110 and 112.

Clock pulses are input at pin 7 of the current limiting chip 60 by conductor 196 to the base of transistor 198. A positive clock pulse on the base of transistor 198 will cause the transistor to conduct, thereby bypassing the constant current source 186 and raising the voltage on the negative input of comparator 184 to above the highest possible voltage available on the positive input of comparator 184. Thus, it will be understood that each clock pulse causes the output of the comparator 184 to go low, turning off the transistor 190, thereby allowing the transistor 106 to go to its conducting state. Thus, each clock pulse will reset the power supply module allowing current to flow in conductor 178, even if the current limit condition has previously been arrived at.

If the current through conductor 178 again rises to the current limit condition, the current limit chip 60 will act as previously described, interrupting the current flow through conductor 178. Thus, it will be understood if the power supply module 62 is operating at its current limit, the output current of the power supply module will be at the current limit condition. If, however, the current through conductor 178 is less than the current limit, the output of current from the power supply module 66 will be as controlled by the power supply control chip 50 supplying the current necessary to hold the voltage at terminal 66 as set by the potentiometer 134.

When margin terminal 70 is grounded, the resistor 132 and a portion of the potentiometer 134 as shown is bypassed, causing the voltage at the negative input of error amplifier 136 to drop. The amplified error voltage from amplifier 136 then increases, causing the width of negative pulses from the comparator 96 (FIG. 4C at 408) to increase. These negative pulses will be applied to the input of NOR gates 94 and 98, causing the power supply module to output current. It will thus be understood that grounding margin terminal 70 will command the power supply module to output current, even if it would not normally be adjusted to do so.

Figure 4L:
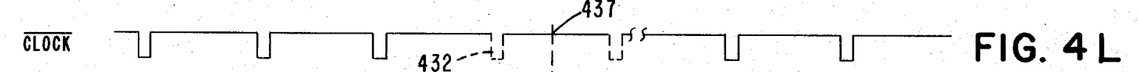
Figure 4M:
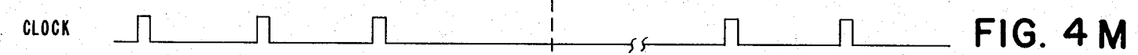

Flip-flop 200 is the other half of flip-flop 74LS74 mentioned previously, and is part of the lost clock detector 62. Flip-flop 200 is arranged as a D flip-flop with its D input on pin 12 connected to the negative clock pulses on terminal 64 (FIG. 4L) by conductor 202. The clock or C input of flip-flop 200 at pin 11 is connected to the output of comparator 204 for receiving positive clock pulses therefrom (a variation of clock pulses resulting from the negative clock pulses of FIG. 4L is shown in FIG. 4M). Comparator 204 has its negative input connected to the ramp output of oscillator 90 (FIG. 4N at 422) by conductor 206, and its positive input is connected to a reference voltage source between resistors 80 and 82 (FIG. 4N at 424) by conductor 208. The Q output of flip-flop 200 on pin 9 is connected to the base of transistor 210 internal to control chip 50. When transistor 210 is conducting, the output of error amplifier 136 is grounded through transistor 210 by ground connection 212.

Figure 4N:
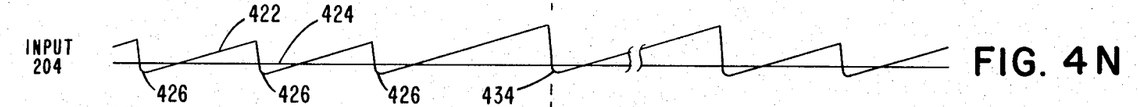
Figure 4O:
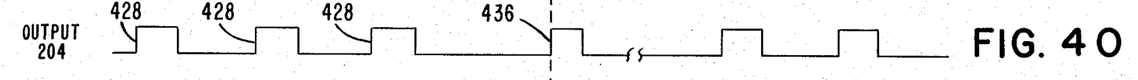
Figure 4P:
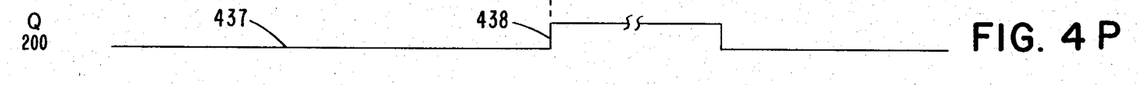

The receipt of a positive clock pulse on pin 3 of the control chip 50 will cause the ramp output of the oscillator 90 to drop to zero (FIG. 4N at 426). This will be below the reference voltage on the positive input of comparator 204, thus the output of comparator 204 will change to a high (FIG. 4O at 428). The positive going edge of this change will be applied to pin 11 of flip-flop 200 while the negative clock pulse from terminal 64 (FIG. 4L) is on pin 12, causing the Q output at pin 9 of flip-flop 200 to be low (FIG. 4P at 437). This low will keep transistor 210 turned off, allowing the circuit to operate as discussed. Since the flip-flop 200 is triggered only by positive going edges of pulses on its pin 11, its Q output will remain low during the positive or high portion of the negative clock pulses on terminal 64.

If a negative clock pulse on terminal 64 is lost (FIG. 4L at 432), the voltage on pin 12 of flip-flop 200 will remain high. The oscillator 90 will not be reset, and its ramp voltage will continue to raise until the oscillator times out. When the ramp voltage then drops to zero (FIG. 4N at 434), the comparator 204 will output a positive going transition to a high (FIG. 4O at 436). At this point, the voltage on pin 12 (FIG. 4L at 437) is also high, causing the Q output of flip-flop 200 to go high (FIG. 4P at 438). This high on the Q output of flip-flop 200 turns on transistor 210, holding the output of the error amplifier 136 at ground, in turn holding the output of comparator 96 high. This high turns off NOR gates 94 and 98, turning off the switches 110 and 112 in the power-output circuit 52.

The flip-flop 200 can be preset by closing grounded switch 214. Switch 214 is connected to the preset of flip-flop 200 by conductor 216. The $\overline{Q}$ output of flip-flop 200 is connected to the reset input of flip-flop 166 by conductor 220. Thus, closing switch 214, resets the voltage regulation indicating circuit 58 and sets the lost clock detector circuit 62.

Figure 3A:
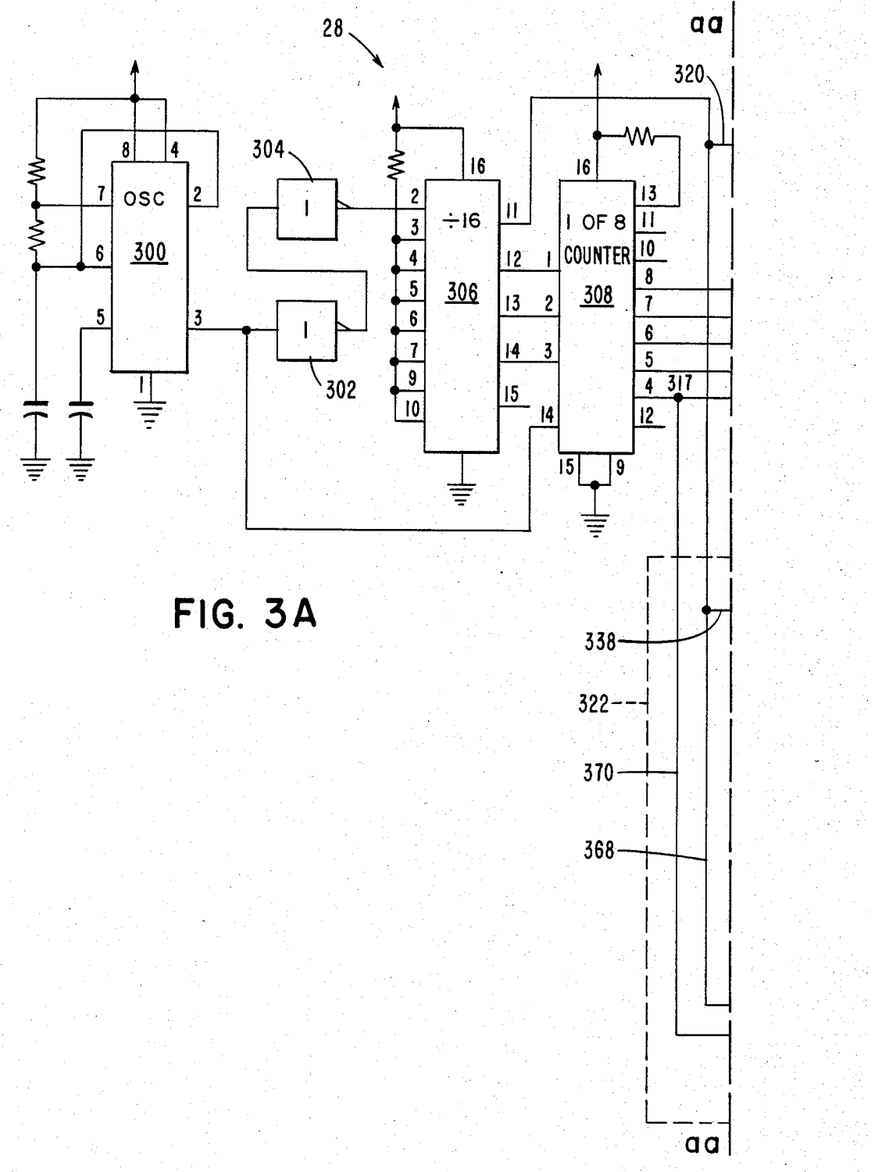
FIGS. 3A and 3B joined along line aa—aa form a schematic diagram of the testing apparatus of the power supply of FIG. 1.
Figure 3B:
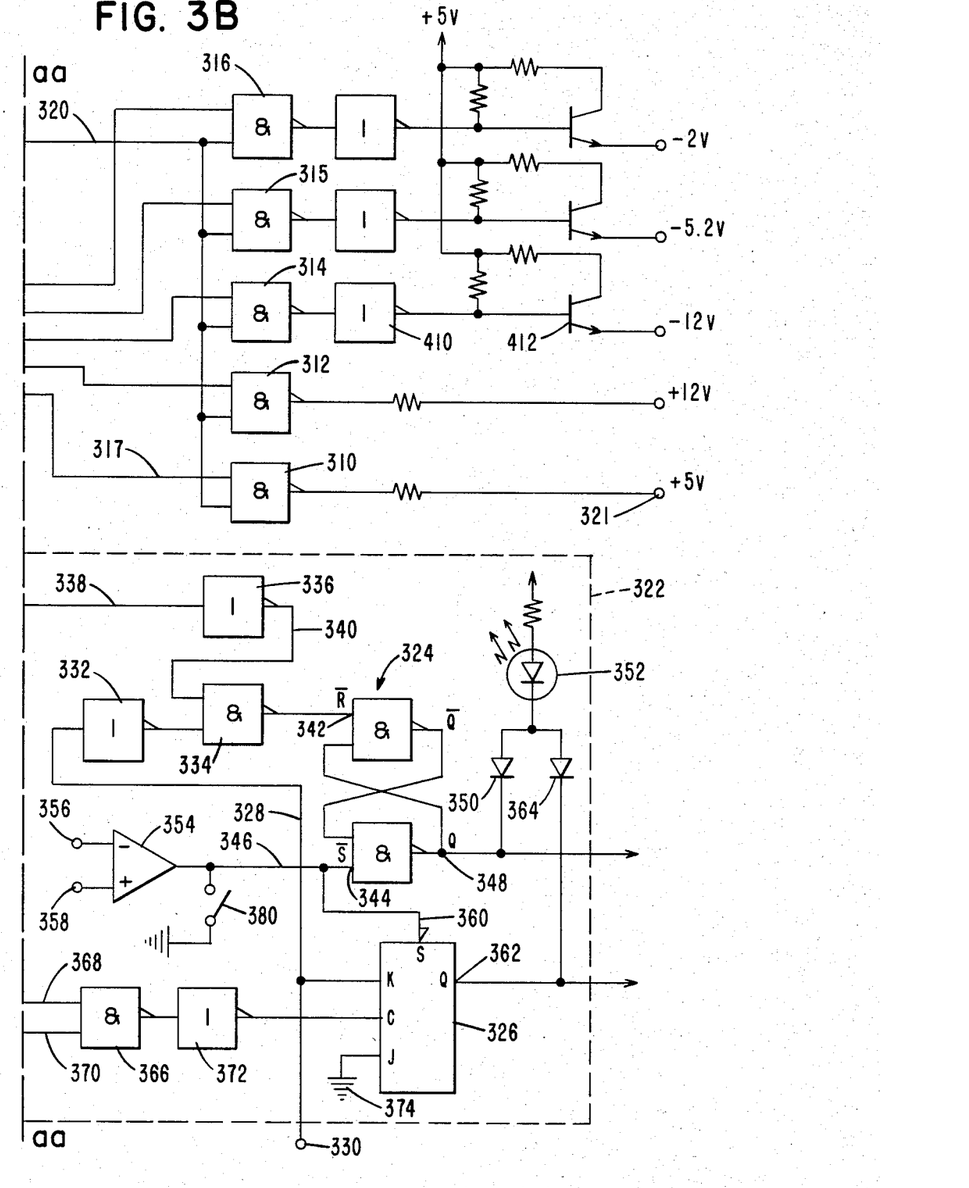

Turning now to FIGS. 3A and 3B, a LM555 chip from the Fairchild Division, configured as shown, forms an oscillator 300 whose output pulses on pin 3 are applied to two inverters 302 and 304 formed of 7404 chips. The output of inverter 304 is applied to pin 2 of a divide-by-16 circuit 306 formed from a 74161 available from the Fairchild Division. The inverters 302 and 304 condition the pulses from the oscillator 300 for the divide-by-16 circuit 306. When connected as shown, the divide-by-16 circuit 306 will count in a binary fashion at its output pins 11 through 14, in accordance with input pulses of the oscillator 300 applied to its pin 2. The least significant bit will appear on its pin 14, and the most significant bit will appear on pin 11. In other words, with the first pulse from oscillator 300, pin 14 will go high and pins 11 through 13 will remain low. Upon the second pulse, pin 14 will go low and pin 13 will go high. On the third pulse, pins 13 and 14 both will go high. This binary counting will continue until the most significant bit on pin 11 goes high. With the next pulse from oscillator 300, pin 11 will remain high and the chip 306 will start to recount. The chip 306 will go through another cycle of counting in binary fashion until the most significant bit on pin 11 returns to the low condition. The least significant bits of divide-by-16 circuit 306 are connected to the binary inputs of a one-of-eight counter 308 formed by a 74LS259 chip available from the Fairchild Division, as shown in FIG. 3A. When connected as shown, the output pins 4 through 12 of the one-of-eight counter 308, sequentially go high in accordance with the binary number appearing on its input pins 1, 2 and 3. Thus, when the binary number 1 appears at the input of counter 308, pin 4 goes high. When the binary number 2 appears at the input, the output pin 4 goes low and the output pin 5 goes high, and so forth until all output pins have been sequenced.

A plurality of NAND gates 310 through 316 are provided, each having one of their inputs connected to one of the output pins of the counter 308, and the other input connected by conductor 320 to the most significant bit output of the divide-by-16 circuit 306. For instance, pin 4 of counter 308 is connected to one input of NAND gate 310 by a conductor 317. It will thus be understood that, for instance, when pin 4 of the counter 308 is high and the most significant bit of divide-by-16 circuit 306 is high, the output of NAND gate 310 will be low.

Each of the NAND gates 310 through 316 will be connected to one of the voltage decks such as shown in FIG. 1. For instance, the terminal 321 at the output of NAND gate 310 will be connected to the margin terminal 70 of the power supply module as shown in FIG. 2C when that module is being used as the redundant module 20 of deck 11 of FIG. 1. Thus, when the most significant bit on terminal 11 of divide-by-16 circuit 306 is high, and pin 4 of the counter 308 is high, the redundant module connected to terminal 320 will be ordered to output current as explained in connection with FIGS. 2A, 2B and 2C.

The most significant bit signal thus divides the test cycle into two parts. When the most significant bit is high, the test circuit sequentially orders the redundant modules to output current by sequentially addressing the NAND gates 310 through 316 as described. When the most significant bit on pin 11 of circuit 306 is low, the NAND gates 310 through 316 are disabled, and the test circuit is then testing the output of the worker modules of the addressed voltage decks. During both of these tests, output current of the redundant power supply module is monitored by monitoring the current-out terminal 68 of the redundant module, as shown in FIG. 2C.

When the most significant bit on pin 11 of circuit 306 is high, the output current indicator on current-out terminal 68 should go low for the respective voltage deck being addressed. When the most significant bit is low, the output current indicator on current-out terminal 68 of the redundant module should be high. This would indicate that the worker modules of the addressed deck are outputting current sufficient to meet the power requirements of that voltage deck such that current from its redundant module is not needed. If any other condition exists, an error is indicated.

The test module 28 includes an error indicating circuit associated with each voltage deck being tested. In FIGS. 3A and 3B, only one such error indicating circuit 322 is shown, and is associated with the +5 voltage deck. However, it will be understood that each voltage deck will have a similar error indicating circuit associated therewith.

The error indicating circuit 322 includes a set-reset flip-flop 324 built with NAND gates for worker module tests, and a JK flip-flop 326 for redundant module tests. The error indicating circuit 322 also has a current indicating line 328 connected to a current-out input terminal 330. Referring back to FIGS. 1 and 2C, terminal 330 of FIG. 3B would be connected, for instance, to the current-out indicating terminal 68 of the redundant module 20 of deck 11 by conductor 36.

Flip-flop 326 is a JK flip-flop formed by a 74LS113A chip available from the Fairchild Division. Current indicating line 328 is connected to the K input of the flip-flop 326 and to the input of an inverter 332. The output of the inverter 332 is connected to one input of a NAND gate 334. The most significant bit output of divide-by-16 circuit 306 is connected to the input of an inverter 336 by a conductor 338. The output of the inverter 336 is connected to the other input of the NAND gate 334 by conductor 340. The output of the NAND gate 334 is connected to the reset input ($\overline{R}$) 342 of the flip-flop 324. The set input ($\overline{S}$) 344 of the flip-flop 324 is connected to a power up line 346. The Q output 348 is connected to the cathode of a diode 350 whose anode is connected to the cathode of a red LED 352 which is one of the LED's 50 of FIG. 1. The anode of the LED 352 is connected to a +5 voltage power supply as shown. When the most significant bit is low, the input at terminal 330 should be high. If not, the red LED 352 will be illuminated to indicate an error condition.

When the power supply for the test module 28 is first energized, a low is applied for a period of time on the conductor 346 to set the flip-flop 324 in the right condition for detecting errors in the worker modules. One way of doing this is to provide a comparator 354 with a reference voltage applied to its negative input 356. The power supply voltage is connected to the positive input 358 of comparator 354. Initially, the power supply voltage will be below the referenced voltage 356, placing a low on conductor 346 and setting the flip-flop 324. This will place a high on the Q output 348 of the flip-flop 324, thereby reverse biasing diode 350 and LED 352 and holding the LED 352 in the off or extinguished condition. When the power supply voltage on input terminal 358 exceeds the referenced voltage on input terminal 356, the output of the comparator 354 will go high allowing the flip-flop 324 to reset responsive to signals on its reset input 342.

After the flip-flop 324 has been reset and the most significant bit is low, the low appears on the input of inverter 336 whose output in turn is high. This high is placed on one input of the NAND gate 334 over conductor 340. During the worker test, when the most significant bit is low, the terminal 330 should be high indicating that the redundant module is not outputting current. The high on terminal 330 will be applied to the input of inverter 332 over conductor 328. With this input high, the output of the inverter 332 will be low, and the output of the NAND gate 334 applied at the reset terminal 342 of the flip-flop 324 will be high, leaving the Q output 348 high.

If, however, the terminal 330 is low indicating that the redundant module is outputting current during the worker test, the output of inverter 332 will be high, inputting a high to the NAND gate 334. Since the output of inverter 336 is also high during the worker test, the output of the NAND gate 334 will be low, resetting the flip-flop 324 such that the Q output 348 goes low. This low will forward bias the diode 350 and the LED 352, illuminating the LED 352 indicating an error condition exists. The flip-flop 324 will remain in this state until it is set by a negative pulse on its set input 344. Thus, even an intermittent error condition will cause the red LED 352 to remain in the illuminated state indicating that an error condition has existed.

The low pulse created by the power up of the test module is also applied to the set terminal of the JK flip-flop 326 by conductor 360. This set pulse causes the Q output 362 of the flip-flop 326 to go high, reverse biasing the diode 364. If the Q output 348 of the flip-flop 324 is also high, the LED 352 will be held in the off state.

The current indicating line 328 is also connected to the K input of the JK flip-flop 326. The most significant bit of divider 306 is connected to one input of NAND gate 366 by conductor 368. The other input of the NAND gate 366 is connected to the appropriate output pin of the counter 306, in this case pin 4 for the +5 voltage deck of the power supply by conductor 370. The output of NAND gate 366 is connected to the input of inverter 372 whose output is connected to the clock or C input of the JK flip-flop 326. As shown, the J input of the JK flip-flop 326 is grounded at 374.

As previously explained, when the most significant bit of divider 306 is high, a redundant module is being tested and a low will appear at terminal 321 commanding the redundant module to output current. If the power supply is working properly, the current indicating output of the redundant module should go low indicating that current is flowing from the redundant module as commanded. The most significant bit, which is high, will be applied to one input of the NAND gate 366, and the output of pin 4 of the counter 308 will be applied to the other input of the NAND gate 366 over conductor 370.

With both inputs high, the output of the NAND gate 366 will be low, causing the output of inverter 372 to go high. At the end of the redundant test of deck 11, the output of NAND gate 366 will go high, causing the output of the inverter 372 to go low. If the K input of the flip-flop 326 is low when the negative going edge of the pulse output from inverter 372 is applied to the clock input of flip-flop 326, the Q output will remain high, causing no change in the condition of the red LED 352. If, however, the K input of flip-flop 326 is high, indicating that the redundant power supply module is not outputting current when ordered to do so, the negative going edge of the pulse applied to the clock input of the flip-flop 326 from the inverter 372 will cause the Q output 362 to go low. This low on the Q output 362 will cause the diode 364 to be forward biased, turning on and illuminating the LED 352 to indicate an error condition exists.

The JK flip-flop 326 will remain with its Q output 362 in the low condition holding the red LED 352 in its on condition, giving a visual indication that the redundant power supply module for that voltage deck has failed.

If the power supply modules are configured to supply a negative voltage on the bus for the voltage deck, the output from the corresponding NAND gates 314 to 316 may be reversed to apply a high to the margin terminal of the affected redundant module, causing that module to output current upon demand. This may be done by providing an inverter 410 connected to the output of, for instance, NAND gate 314 to invert the low from NAND gate 314 to a high when the NAND gate 314 is selected during the redundant test. The output of the inverter 410 is connected to the base of a transistor 412 to turn on the transistor 412 to its conducting condition when the output of the inverter 410 goes high. The collector of the transistor 412 is connected to a positive voltage supply such that when the output of the inverter 412 goes high, a sufficient voltage source will be applied to the margin input of the redundant power supply module of the connected negative voltage deck to cause its redundant power supply module to output current.

As previously mentioned, the failed module can be located and replaced by scanning the LED's of the power supply modules. This replacement can be done without turning off or interrupting the operations of the power supply. A negative pulse is then applied to the power supply indicator line 346 of FIG. 3, such as by temporarily closing the grounded switch 380, to set the flip-flops 324 and 326 in their initial condition, thereby turning off the red LED 352.

In operation, a volt meter 400 is applied to the bus, for instance, the +5 bus 12 shown in FIG. 1, and a plurality of power supply modules 22 are connected to the bus until the voltage on the bus 12 reaches +5 volts. The potentiometer corresponding to the potentiometer 134 of FIG. 2C, for the controller module 18 is adjusted until the green light 24 of the controlling module 18 of deck 11 is illuminated. The potentiometers of all of the power supply modules of deck 11 are then adjusted and the voltage of the bus 12 appearing on the volt meter 400 is closely observed until: the deck 11 voltage reaches +5 volts, the green light 24 of the controller power module 18 is illuminated, and the green lights 24 of the other worker modules are just turned off. At this point, all of the amber lights 26 of the worker modules 22 should be illuminated indicating that all of the worker modules 22 are outputting current to the bus 12.

Switching off one of the non-controlling worker modules 22 will cause the voltage on bus 12 to decrease, thereby extinguishing the green LED 24 of the controller module 18, indicating that the voltage on bus 12 is no longer being regulated. When the worker module 22 is turned on, the voltage on the bus 12 will again rise to the regulated value, and the green LED 24 of the controller module 18 will once again turn on. A redundant module 20 is then connected to the bus 12 and adjusted until its green LED 24 is illuminated and its amber LED 26 is extinguished. Turning off any one of the worker modules 22 of deck 11 should cause the amber light 26 of the redundant module 20 of deck 11 to be illuminated.

After all of the voltage decks in the power supply have been thus set, the test module 28 is powered up, or the error checking circuits for the voltage decks are otherwise set by use of switch 380 of FIG. 3B, such that the red LED's 50 are extinguished. The testing circuit 28 can then start its testing cycles as previously described.

An alternate method, is to connect more power supply modules than are necessary to the bus. The controlling module is then adjusted as previously described until the voltage on the bus is adjusted to the level desired. The remaining worker modules are then adjusted to the point where their green LED's are just extinguished, leaving only the green LED of the controlling module 18 illuminated. The other worker modules are then turned off one at a time until all of the amber LED's are illuminated. The last worker module to be turned off is then turned on and adjusted to become the redundant module.

Thus, a redundant modular power supply has been shown and described which tests the correct operation of all of the modules, including the redundant module. While the invention has been described with reference to specific embodiments thereof, it will be understood by those skilled in the art that various changes and modifications can be made therein without departing from the spirit and scope of the invention as herein claimed.

What is claimed is:

1. A modular power supply comprising at least one worker module for supplying power requirements;
   a redundant module in parallel with said worker module, said redundant module including current delivery means responsive to a test command for causing said redundant module to deliver current, and output signaling means for generating an electrical signal when current is being output from said redundant module; and
   power supply testing means including test signal generating means operatively connected to said redundant module for generating a test command thereby causing said redundant module to deliver current, and indicating means operatively connected to said output signaling means and being operable for indicating the output of current from said redundant module other than when said current-output is responsive to a test command generated by said test command generating means.

2. The modular power supply of claim 1 wherein said indicating means includes means operable for indicating the lack of output current from said redundant module when said redundant module has been ordered to deliver current by a test command generated by said power supply testing means.

3. The modular power supply of claim 1 wherein said worker module includes means for limiting its current output to a set level, and said modular power supply further comprising:
   a controlling module connected in parallel with said worker module for supplying a portion of the power requirements, said controlling module including a power output terminal for outputting regulated power; adjustable voltage sensing means for adjustably sensing the voltage on said power output terminal; and current output means operatively connected to said voltage sensing means for varying the current output of said controlling module responsive to the adjustment of said voltage sensing means whereby the voltage level on said power output terminal is controlled.

4. The modular power supply of claim 1 comprising a plurality of worker modules, including the previously mentioned worker module, arranged in decks for supplying a plurality of separate supply voltages;
   a plurality of redundant modules, including the previously mentioned redundant power supply module, wherein one of said redundant power supply modules is connected in parallel with at least one of said worker power supply modules in each of said decks; and
   wherein said power supply testing means includes selecting means for sequentially selecting voltage supply decks for testing, and a plurality of said indicating means, each of said indicating means being operatively connected to one of the respective redundant power supply modules of said voltage supply decks.

5. The modular power supply of claim 4 wherein said power supply testing means comprises:
   counting means having means for generating less significant bits and a most significant bit, said less significant bits counting from one to a number representative of the number of decks in said power supply, and said most significant bit alternating between a first state and a second state, said most significant bit changing to its other state subsequent to each occurrence of said counting means less significant bits counting to the number of decks; and addressable means responsive to said less significant bits and said most significant bit for testing a different deck with each number representation of said less significant bits.

6. The modular power supply of claim 5 wherein said addressable means further includes means for testing the worker modules of said decks when said most significant bit is in said first state, and for testing the redundant module of said decks when said most significant bit is in said second state.

7. A testing circuit for testing the modules of a voltage deck in a redundant modular power supply having worker modules and a redundant module, said testing circuit comprising:
counting means for sequentially conducting a worker module test and a redundant module test;
output means responsive to said counting means and having an output terminal for connection to the redundant module, said output means placing a command on said output terminal instructing the redundant module to output current during said redundant module test;
input means having an input terminal for receiving a signal from said power supply indicating the output of said power supply; and
fault determining means responsive to said counting means and said input means for determining a fault in said redundant power supply dependent upon the instruction on said output terminal and the signal on said input terminal.

8. The testing circuit of claim 7 comprising a visual indicating means responsive to said fault determining means for providing a visual indication of a detected fault.

9. The testing circuit of claim 7 comprising a plurality of output means, input means and faults determining means arranged for determining faults on a plurality of voltage decks in said redundant modular power supply.

10. The testing circuit of claim 9 further comprising a plurality of visual indicators, one of said visual indicators being responsive to each of said fault determining means for giving a visual indication of a detected fault in its respective voltage deck.

11. In a redundant modular power supply having a plurality of worker modules organized in separate voltage decks, and a plurality of redundant modules, one for each voltage deck, the method of:
a. providing each redundant module with an input terminal which, when addressed, causes its redundant module to output current;
b. providing each redundant module with an output terminal which outputs an electrical signal when its redundant module is outputting current;
c. sequentially addressing each redundant module thereby causing the addressed redundant module to output current;
d. monitoring the output terminal of the addressed redundant module; and
e. providing an indication of any addressed redundant module which does not output an electrical signal indicative of outputting current when the respective redundant module is addressed.

12. The method of claim 11 further comprising:
f. sequentially monitoring the output terminal of each redundant module; and
g. providing an indication of any redundant module outputting an electrical signal indicative of outputting current when the respective redundant module has not been ordered to do so.

13. The method of claim 11 further comprising:
f'. replacing the respective redundant module indicated in step e.

14. The method of claim 12 further comprising:
h. replacing one of the worker modules in the voltage deck of the respective redundant module indicated in step g.

15. In a power supply having a plurality of modules separably addable to a voltage bus, each of said modules having a voltage indicator for indicating if its voltage output is at an adjustable voltage indicating level and a current indicator for indicating if it is outputting current, the method comprising:
a. adding a number of modules to the bus sufficient to meet the power demands of the bus;
b. adjusting the voltage level of one of the modules until its voltage indicator indicates that its output is at a desired voltage level;
c. adjusting the rest of the levels of the other modules until their voltage indicators indicate that their output voltages are just below the levels so adjusted;
d. removing the other modules one at a time until the current indicators of all of the modules indicate that all of the modules are outputting current;
e. adding one more module and adjusting its voltage indicating level until its voltage indicator indicates that its voltage output as at the desired voltage level; and
f. periodically testing the current indicator of said last added module for an indication of current being output.

16. The method of claim 15 further comprising:
g. periodically commanding said last added module to output current; and
h. testing the current indicator of said last added module to determine if current is being output in response to the command of step g.

17. An apparatus for testing a power supply comprising:
an oscillator having an output, said oscillator generating a series of pulses;
a counter connected to the output of said oscillator and having a most significant bit terminal, said counter operable for counting the pulses of said oscillator and changing the state of said most significant bit terminal between a first state and a second state dependent upon the number of pulses counted by said counter;
a gate having an input connected to the most significant bit terminal of said counter, and an output whose state is changeable between a first state and a second state dependent upon the state of the most significant bit on the input of said gate;
an apparatus input terminal for connection to the power supply being tested, said state of said apparatus input terminal being changeable between a first state and a second state dependent upon the output of a power supply being tested;
a first flip-flop operatively connected to said apparatus input terminal and said most significant bit terminal, said first flip-flop having an output terminal whose state is changeable between a first state and a second state dependent upon the state of said apparatus input terminal and said most significant bit terminal; and a second flip-flop operatively connected to said apparatus input terminal and said most significant bit terminal, said second flip-flop having an output terminal whose state is changeable between a first state and a second state dependent upon the state of said apparatus input terminal and said most significant bit terminal;

wherein the states of the output terminals of said first flip-flop and second flip-flop indicates the functional condition of a power supply being tested.

18. The apparatus of claim 17 further comprising a visual indicator connected to the outputs of said first flip-flop and said second flip-flop for giving a visual indication when the output of either of said first flip-flop or said second flip-flop changes from its first state to its second state.

* * * * *